(12) United States Patent
Kim et al.

(10) Patent No.: US 9,904,049 B2
(45) Date of Patent: Feb. 27, 2018

(54) LENS MODULE

(71) Applicant: SAMSUNG ELECTRO-MECHANICS CO., LTD., Suwon-si (KR)

(72) Inventors: Duck Hun Kim, Suwon-si (KR); Young Suk Kang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 93 days.

(21) Appl. No.: 15/009,145

(22) Filed: Jan. 28, 2016

(65) Prior Publication Data

US 2016/0349504 A1 Dec. 1, 2016

(30) Foreign Application Priority Data

May 27, 2015 (KR) .................. 10-2015-0074099

(51) Int. Cl.
*G02B 27/00* (2006.01)
*G02B 5/00* (2006.01)
*G02B 7/02* (2006.01)
*G02B 13/00* (2006.01)

(52) U.S. Cl.
CPC ......... *G02B 27/0018* (2013.01); *G02B 5/003* (2013.01); *G02B 7/021* (2013.01); *G02B 13/0045* (2013.01)

(58) Field of Classification Search
CPC .............. G02B 27/0018; G02B 13/0045; G02B 7/021; G02B 5/003
See application file for complete search history.

(56) References Cited

U.S. PATENT DOCUMENTS

| 8,967,814 | B2 | 3/2015 | Chang | |
|---|---|---|---|---|
| 2007/0280091 | A1* | 12/2007 | Apel | G02B 7/026 369/275.1 |
| 2012/0314288 | A1* | 12/2012 | Lai | G02B 13/0035 359/503 |

FOREIGN PATENT DOCUMENTS

| JP | 2014-81628 A | 4/2014 |
|---|---|---|
| KR | 10-2012-0000809 A | 1/2012 |

* cited by examiner

*Primary Examiner* — Joseph P Martinez
(74) *Attorney, Agent, or Firm* — NSIP Law

(57) ABSTRACT

A lens module includes a lens barrel, a plurality of lenses disposed in the lens barrel and aligned along an optical axis, and a spacer, disposed between the plurality of lenses, comprising a light blocking hole configured to allow light incident to the plurality of lenses to pass therethrough, wherein a light absorbing layer is disposed on a wall surface of the spacer forming the light blocking hole.

20 Claims, 8 Drawing Sheets

LENS MODULE

CROSS-REFERENCE TO RELATED APPLICATION

This application claims the benefit 35 USC 119(a) of Korean Patent Application No. 10-2015-0074099 filed on May 27, 2015, with the Korean Intellectual Property Office, the entire disclosure of which is incorporated herein by reference for all purposes.

BACKGROUND

1. Field

The present disclosure relates to a lens module.

2. Description of Related Art

Recently, in addition to text or voice data, it has become common to transmit image data in portable communications terminals such as mobile phones, personal digital assistances (PDAs), portable computers, or the like. Therefore, in accordance with this trend, in order to perform image data transmission, photo messaging, or the like, camera modules have commonly been installed in portable communications terminals.

The camera module may include a plurality of stacked lenses, and light passing through the plurality of lenses may be collected in an image sensor and stored as data in a device's memory. A spacer may be disposed between the plurality of lenses in order to maintain an interval between the plurality of lenses, or to block unnecessary light. A light blocking hole having a preset size may be formed in the spacer to allow light to pass therethrough. Here, there is a problem in that light reflected from a subject may be reflected by a wall surface of the spacer forming the light blocking hole while being incident on an internal portion of the camera module.

In this case, a flare phenomenon, or the like, such as light spread, may be generated, which may have a negative influence on image quality. Therefore, there is a need to prevent light from being reflected by the wall surface of the spacer.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a lens module capable of preventing light incident to a plurality of lenses from being reflected by a spacer disposed between the plurality of lenses and causing a flare phenomenon. The lens module includes a lens barrel, a plurality of lenses disposed in the lens barrel and aligned along an optical axis, and a spacer, disposed between the plurality of lenses, comprising a light blocking hole configured to allow light incident to the plurality of lenses to pass therethrough, wherein a light absorbing layer is disposed on a wall surface of the spacer forming the light blocking hole.

In another general aspect, a lens module includes a lens barrel, a plurality of lenses disposed in the lens barrel and stacked along an optical axis, and a plurality of spacers, disposed between the plurality of lenses. The plurality of spacers include a light blocking hole configured to allow light incident to the plurality of lenses to pass therethrough, wherein a wall surface of any one of the plurality of spacers, forming the light blocking hole, includes a plurality of inclined surfaces. The wall surface of the spacer is a perpendicular surface, an inclined surface, or a curved surface, or any combination thereof. Light absorbing layers are disposed on the wall surfaces of the plurality of spacers forming the light blocking hole, respectively.

Therefore, reflection of light from the wall surface of the spacer may be prevented by the light absorbing layer.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
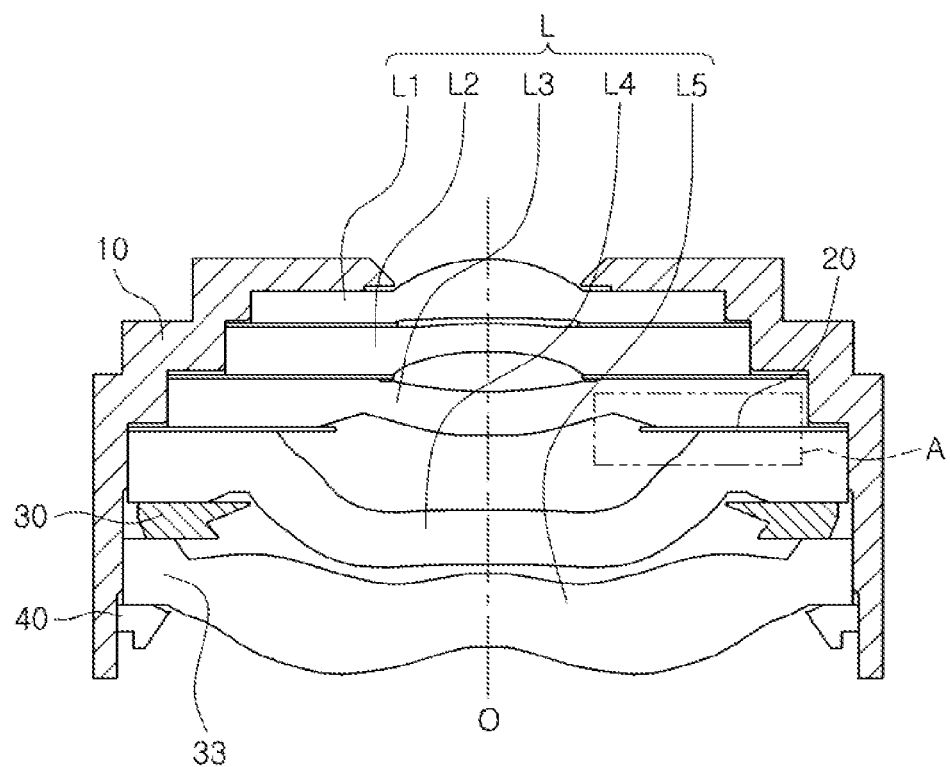
FIG. 1 is a cross-sectional view of a lens module.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

An optical axis (O) direction refers to a vertical direction in relation to a lens barrel 10. Words describing relative spatial relationships, such as "below", "beneath", "under", "lower", "bottom", "above", "over", "upper", "top", "left", and "right", may be used to conveniently describe spatial relationships of one device or elements with other devices or elements. Such words are to be interpreted as encompassing a device oriented as illustrated in the drawings, and in other orientations in use or operation. For example, an example in which a device includes a second element disposed above a first element based on the orientation of the device illustrated in the drawings also encompasses the device when the device is flipped upside down in use or operation.

Referring to FIG. 1, the lens module includes the lens barrel 10, a plurality of lenses L disposed in the lens barrel 10 along the optical axis O, and spacers 20 and 30 disposed between the plurality of lenses L. The lens barrel 10 has a hollow cylindrical shape so that the plurality of lenses L imaging a subject may be accommodated therein, and the optical axis O is disposed in a central portion of the plurality of lenses L in order to form a focus of light incident from the outside. The plurality of lenses L are disposed in the lens barrel 10 along the optical axis O.

Referring to FIG. 1, although first to fifth lenses L1 to L5 are illustrated sequentially from a lens close to a subject (at upper most end of the lens barrel 10) to a lens on an image side (at lower most end of the lens barrel 10), the present disclosure is not limited by the number of lenses. For example, the number of lenses included in the lens module may vary depending on the desired resolution.

The plurality of lenses L may be formed of glass, through glass molding, a thermosetting resin, a thermoplastic resin, or plastic. The plurality of lenses L may be sequentially stacked in the lens barrel 10.

A press-fitting ring 40 is disposed below a lens disposed farthest away from the subject among the plurality of lenses L. In other words, the press-fitting ring 40 is disposed below the fifth lens L5. The press-fitting ring 40 fixes the plurality of lenses L sequentially stacked in the lens barrel 10. The number of the plurality of lenses L may vary depending on a design of the lens module 10, and the respective lenses may have optical characteristics such as the same refractive index or different refractive indices, or the like.

The plurality of lenses L includes a lens function part in which light is refracted while passing therethrough and a flange part. The lens function part refracts the light reflected from a subject. To this end, the lens function part may have a concave, convex, or meniscus shape.

The flange part is formed at an edge of the lens function part, and has a portion that contacts the lens barrel 10 or the spacer 20 or 30. In addition, in order to prevent unnecessary light from transmitting through the flange part, a light blocking material may be coated on the flange part, or a light blocking film may be attached to the flange part.

The spacers 20 and 30 are disposed between the plurality of lenses L to maintain intervals between the lenses. One or more spacers 20 and 30 may be provided depending on the number of the plurality of lenses L. The spacers 20 and 30 are disposed between the plurality of lenses L to space the plurality of lenses L apart from each other at predetermined intervals. The thicknesses of the spacer 20 and 30 are determined according to the intervals between the plurality of lenses L. Hereinafter, a description will be provided in relation to the spacer 20 having a relatively reduced thickness.

In order to prevent unnecessary light from transmitting through the spacer 20, a light blocking material is coated on the spacer 20, or a light blocking film is attached to the spacer 20. In addition, the spacer 20 may be formed of an opaque material. For example, the spacer 20 may be formed of a nonferrous metal, such as copper or aluminum. In this case, there are advantages in that it is easy to form the spacer 20, and a production cost is decreased.

Further, the spacer 20 adjusts an amount of light passing through the plurality of lenses L. For example, a light blocking hole (not illustrated) penetrating through the spacer 20 in the optical axis (O) direction is formed in the spacer 20, and light incident through the plurality of lenses L passes through the light blocking hole. A size of the light blocking hole is determined depending on a degree of refraction of the light passing through the plurality of lenses L, and the light blocking hole is sized so that the light refracted while passing through the plurality of lenses L is incident on an image sensor (not illustrated).

Further, the size of the light blocking hole gradually increases in a direction away from the subject. For example, the size of the light blocking hole in the spacer 20 between the second lens L2 and third lens L3 is greater than the blocking hole in the spacer 20 between the first lens L1 and second lens L2. This is to prevent a path of the light incident on the image sensor from being disturbed because the light may be refracted to thereby be widely spread while passing through the plurality of lenses L.

Here, since the light blocking hole is formed to penetrate through the spacer 20, there is a risk that the light may be reflected by a wall surface 20a of the spacer 20 forming the light blocking hole. In a case in which the light is reflected by the wall surface 20a of the spacer 20 to thereby be incident on the image sensor, image quality is deteriorated. However, the lens module of FIG. 2 prevents the light from being reflected by the wall surface 20a of the spacer 20. In addition, the lens module prevents the reflected light from being incident on the image sensor even if the light is reflected by the wall surface 20a of the spacer 20.

Figure 2:
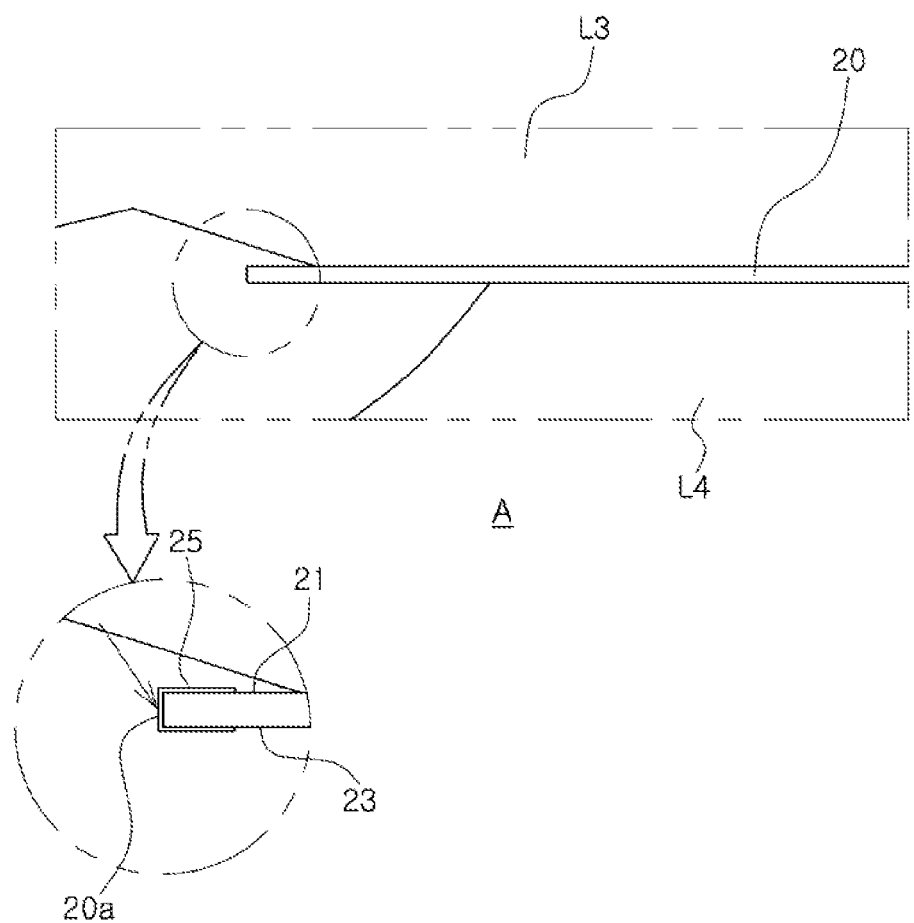
FIG. 2 is an enlarged view of part A of FIG. 1.

Referring to FIG. 2, the wall surface 20a of the spacer 20 forming the light blocking hole is parallel with the optical axis O. Here, a light absorbing layer 25 may be provided on the wall surface 20a of the spacer 20 forming the light blocking hole. The light absorbing layer 25 absorbs light incident on the wall surface 20a of the spacer 20. The light absorbing layer 25 is formed by performing black oxide treatment on the wall surface 20a of the spacer 20. For example, the light absorbing layer 25 is a black coating film or formed of a black iron oxide. Therefore, even if light passing through the plurality of lenses L is incident on the wall surface 20a of the spacer 20, the light is absorbed by the light absorbing layer 25, and reflection of the light by the wall surface 20a of the spacer 20 is prevented.

In a case in which light is reflected by the wall surface 20a of the spacer 20, the reflected light may be incident on the image sensor, and thus image quality may be deteriorated. However, in the lens module of FIG. 2, the light absorbing layer 25 prevents light from being reflected from the wall surface 20a of the spacer 20, and deterioration of image quality by the reflected light is prevented.

Figure 3A:
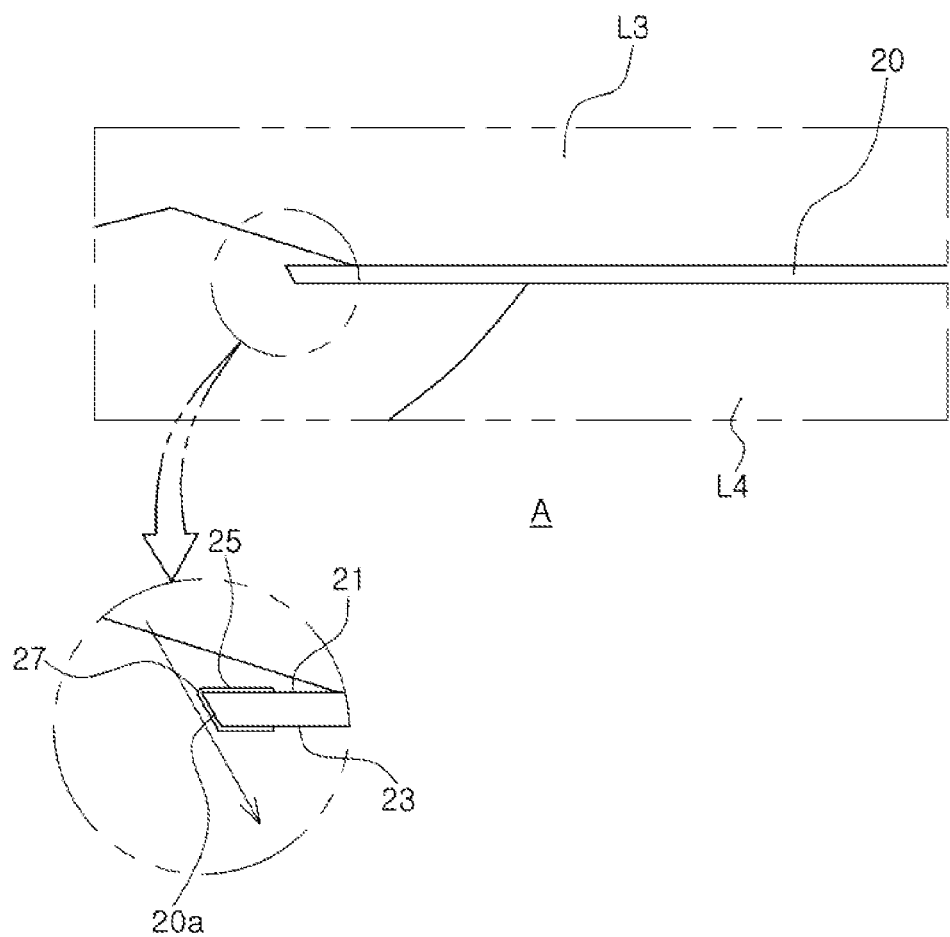
FIGS. 3A and 3B illustrate a first modified example of FIG. 2.

Referring to FIG. 3A, a wall surface 20a of a spacer 20 is inclined. For example, the wall surface 20a of the spacer 20 is inclined at a predetermined angle with respect to the optical axis O in order to prevent the path of light incident on the image sensor from being disturbed by the wall surface 20a. An inclination angle of the wall surface 20a with respect to the optical axis O may be set depending on refractive index of the plurality of lenses L in a range in which a path of light incident on the image sensor is not disturbed.

Further, the wall surface 20a of the spacer 20 is inclined so that a distance between the wall surface 20a and the optical axis O gradually increases in a direction away from the subject. For example, an angle between an upper surface 21 of the spacer 20 and the wall surface 20a of the spacer 20 is less than 90°. Therefore, occurrence of interference between light incident on the image sensor and the wall surface 20a of the spacer 20 is prevented.

An edge portion 27 formed by the intersection of the upper surface 21 of the spacer 20 and the wall surface 20a of the spacer 20 is sharp. If light is incident on the edge portion 27, the light is absorbed by the light absorbing layer 25. However, even if light is reflected off the edge portion 27, for example, due to defects of the light absorbing layer 25, an amount of reflection of the light is decreased due to the sharp shape of the edge portion 27. Therefore, deterioration of image quality due to the reflected light is prevented.

Figure 3B:
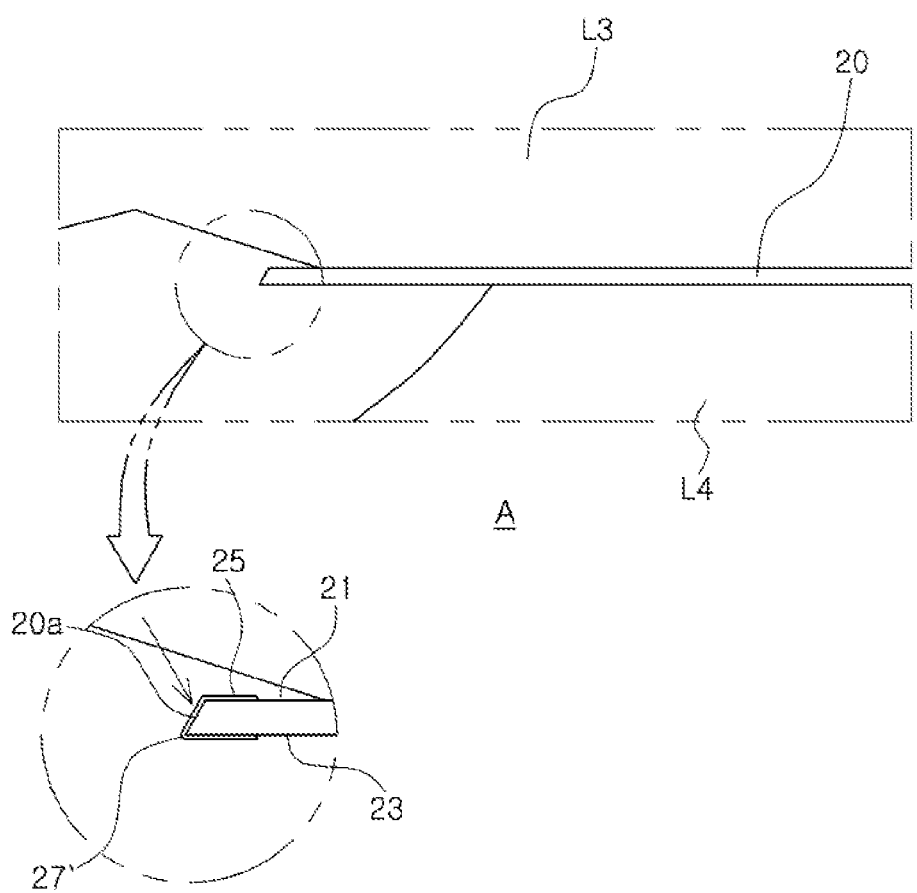

Referring to FIG. 3B, an inclined direction of a wall surface 20a of a spacer 20 is opposite to that in FIG. 3A. For example, the wall surface 20a of the spacer 20 is inclined so that a distance between the wall surface 20a and the optical axis O gradually decreases in a direction away from the subject. Therefore, an angle between an upper surface 21 of the spacer 20 and the wall surface 20a of the spacer 20 is greater than 90°, and an angle between a lower surface 23 of the spacer 20 and the wall surface 20a of the spacer 20 is less than 90°.

In this case, reflection of light from the wall surface 20a of the spacer 20 is prevented, since the light absorbing layer 25 is provided on the wall surface 20a of the spacer 20. Further, even if light is reflected off the wall surface 20a of the spacer 20, for example, due to defects of the light absorbing layer 25, the light reflected from the wall surface 20a of the spacer 20 is reflected in a direction toward the subject due to the angle of the wall surface 20a, thereby preventing the reflected light from being incident on the image sensor.

Figure 4A:
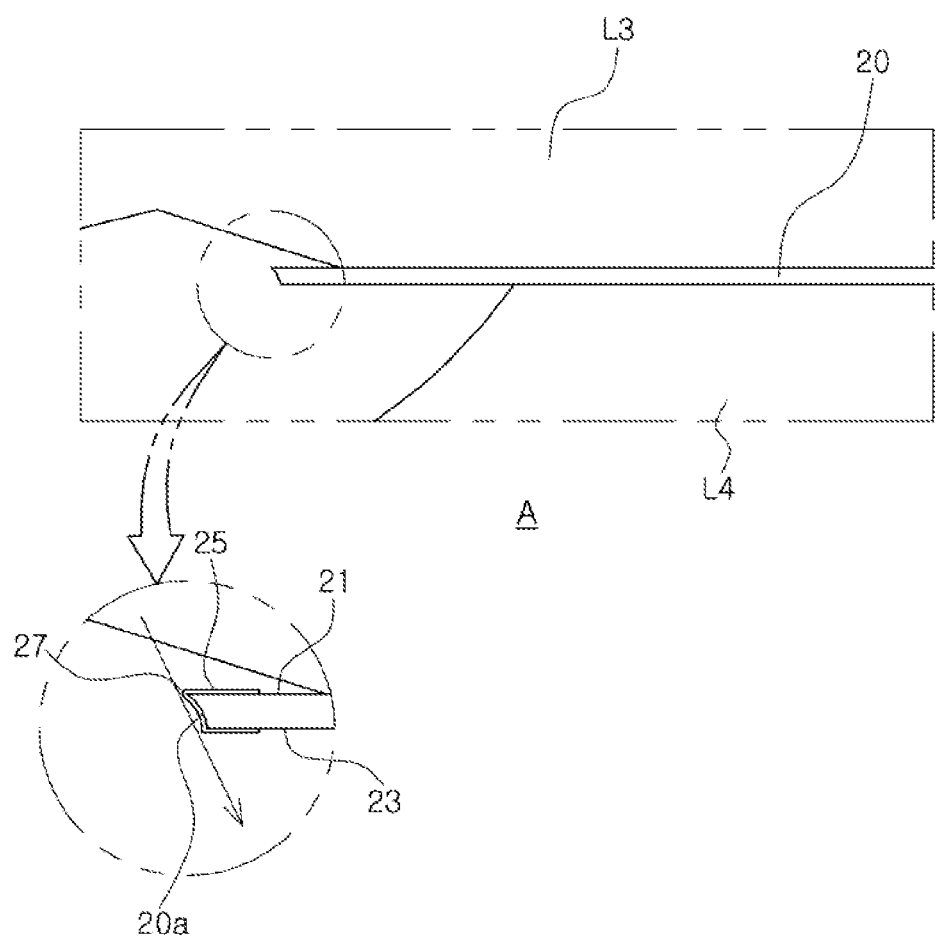
FIGS. 4A and 4B illustrate a second modified example of FIG. 2.

Referring to FIG. 4A, a wall surface 20a of a spacer 20 is formed to be concave in order to prevent light reflected by the wall surface 20a to pass through the light blocking hole. For example, as illustrated in FIG. 4A, the wall surface 20a of the spacer 20 has a curved surface having a preset curvature. Further, an edge portion 27 formed at the intersection of an upper surface 21 of the spacer 20 and the wall surface 20a of the spacer 20 is sharp and protrudes toward the optical axis O further than other portions of the wall surface 20a of the spacer 20.

Further, the wall surface 20a of the spacer 20 is a curved surface preventing light from being incident on other portions except for the edge portion 27. The curvature of the wall surface 20a may be variously set depending on refractive force of the plurality of lenses L in a range in which a path of light incident on the image sensor is not disturbed. Therefore, an occurrence of interference between the light incident on the image sensor and the wall surface 20a of the spacer 20 is prevented.

Further, even if light is incident on the edge portion 27 to thereby be reflected, a degree of reflection of the light is decreased by the sharp shape of edge portion 27. Therefore, deterioration of image quality due to the reflected light is prevented.

Figure 4B:
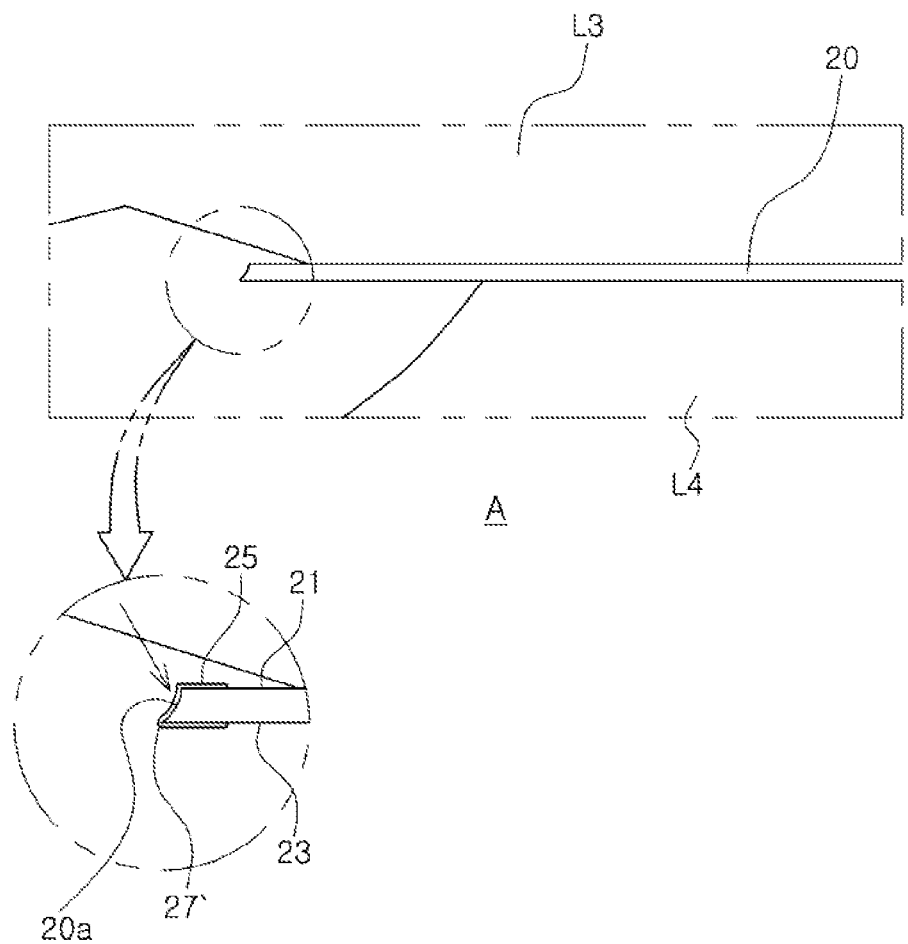

Referring to FIG. 4B, similar to FIG. 4A, a wall surface 20a of a spacer 20 is concave in order to prevent light reflected by the wall surface 20a to pass through the light blocking hole, and has a curved surface having a preset curvature. However, in FIG. 4B, an edge portion 27' formed at the intersection of a lower surface 23 of the spacer 20 and the wall surface 20a of the spacer 20 is sharp and protrudes toward the optical axis O further than other portions of the wall surface 20a of the spacer 20.

In this case, reflection of light from the wall surface 20a of the spacer 20 is prevented, since the light absorbing layer 25 is provided on the wall surface 20a of the spacer 20. Further, even if light is reflected from the wall surface 20a of the spacer 20, for example, due to defects of the light absorbing layer 25, the light reflected from the wall surface 20a of the spacer 20 is reflected in a direction toward the subject, and away from the image sensor, thereby preventing the reflected light from being incident on the image sensor.

Further, even if light is incident on the edge portion 27' to thereby be reflected, an amount of the reflected light is reduced by the sharp shape of the edge portion 27'. Therefore, deterioration of image quality due to the reflected light is prevented.

Figure 5A:
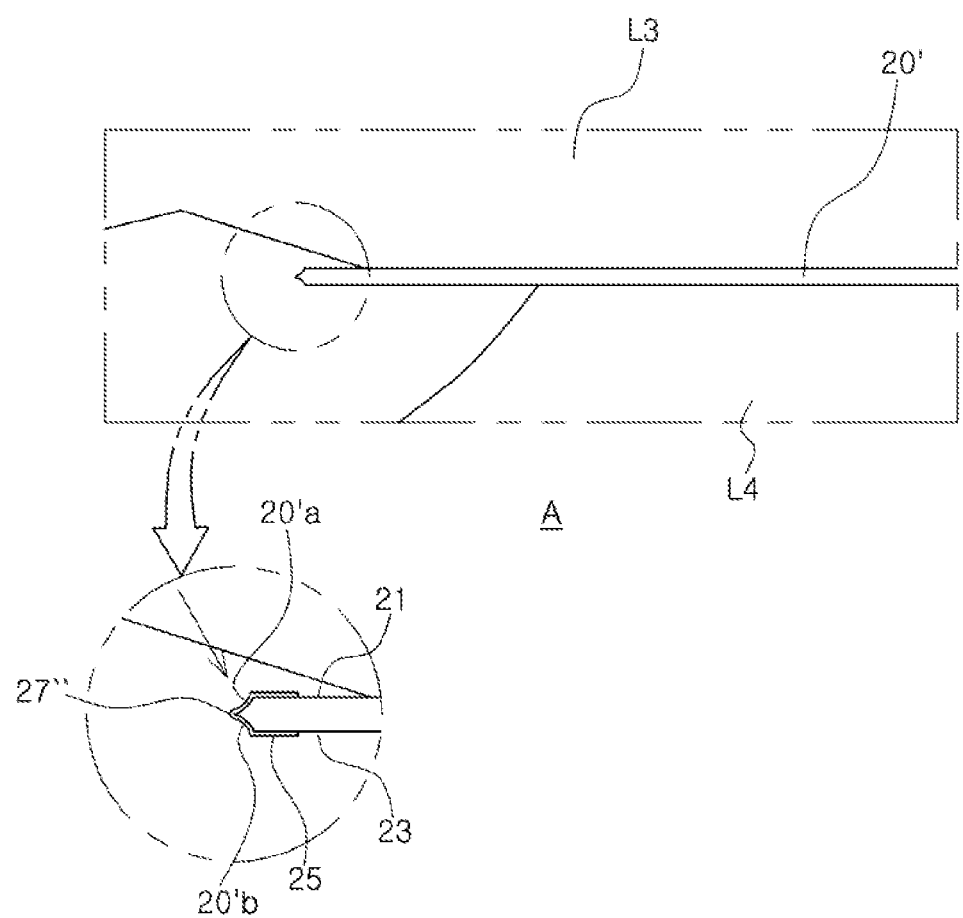
FIGS. 5A and 5B illustrate a third modified example of FIG. 2.

Referring to FIG. 5A, a wall surface of a spacer 20 has first and second curved portions 20'a and 20'b having a preset curvature, and the first and second curved portions 20'a and 20'b are discontinuous curves. Further, an edge portion 27" formed at an intersection of the first and second curved portions 20'a and 20'b.

For example, the first curved portion 20'a is disposed above the edge portion 27" in the optical axis (O) direction, and the second curved portion 20'b is disposed below the edge portion 27" in the optical axis (O) direction. That is, the edge portion 27" is disposed on a central portion of the wall surface of the spacer 20, and protrudes toward the optical axis O further than other portions of the wall surface of the spacer 20. Therefore, light incident on the first curved portion 20'a, but is not incident on the second curved portion 20'b. The light incident on the first curved portion 20'a is absorbed by the light absorbing layer 25 disposed on the wall surface of the spacer 20. If the light is reflected from the first curved portion 20'a, for example, due to defects of the light absorbing layer 25, the light reflected from the first curved portion 20'a is reflected in a direction toward the subject and away from the image sensor, thereby preventing the reflected light from being incident on the image sensor. Further, even if light is incident on the edge portion 27" to thereby be reflected, a degree of reflection of the light is reduced by the sharp shape of the edge portion 27". Therefore, deterioration of image quality due to the reflected light is prevented.

Figure 5B:
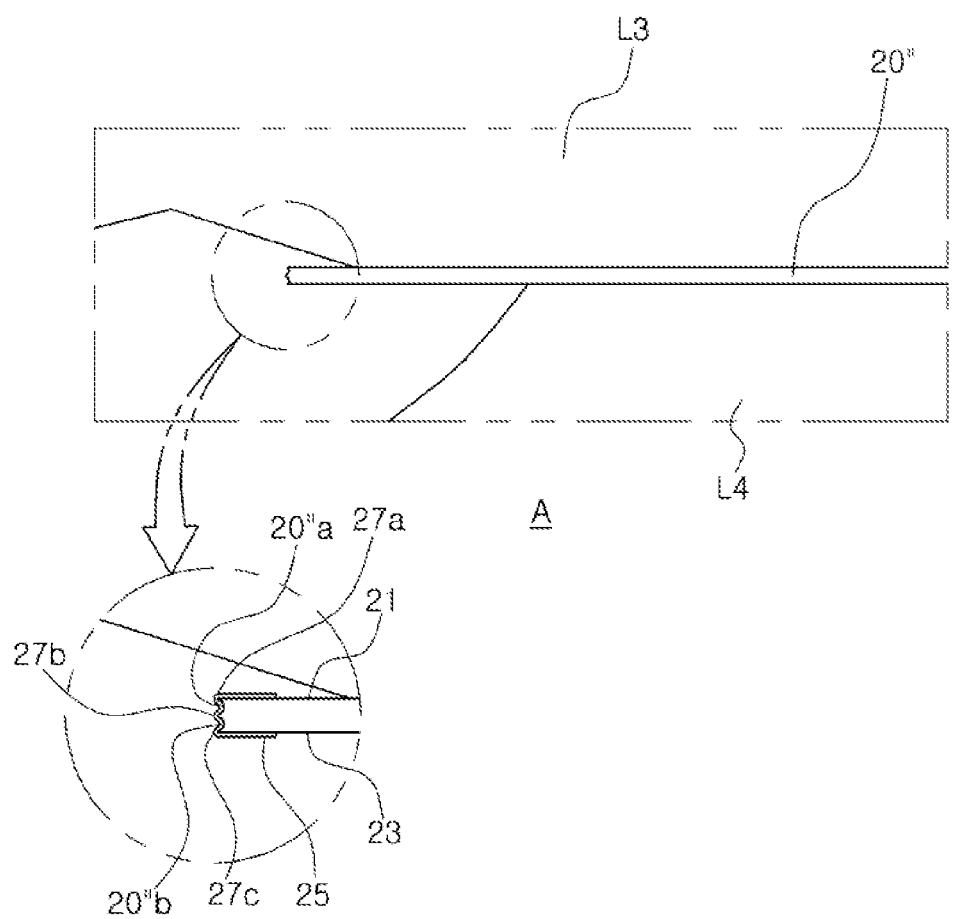

Referring to FIG. 5B, similar to FIG. 5A, a wall surface of a spacer 20 has first and second curved portions 20"a and 20"b having a preset curvature, and the first and second curved portions 20"a and 20"b are discontinuous curves. However, a first edge portion 27a formed at an intersection between an upper surface 21 of the spacer 20 and the first curved portion 20"a, a second edge portion 27b formed at the intersection of the first curved portion 20"a and the second curved portion 20"b, and a third edge portion 27c formed at an intersection of a lower surface 23 of the spacer 20 and the second curved portion 20"b are sharp.

The first curved portion 20"a is disposed above the second edge portion 27b in the optical axis (O) direction, and the second curved portion 20"b is disposed below the second edge portion 27b in the optical axis (O) direction. The second edge portion 27b is disposed on a central portion of the wall surface of the spacer 20. The first through third edge portions 27a though 27c contact a virtual line parallel with the optical axis O. In other words, the distance each of the first through third edge portions 27a through 27c extend is the same.

Light incident on the first and second curved portions 20"a and 20"b is absorbed by the light absorbing layer 25 disposed on the wall surface of the spacer 20. Even if light is reflected from the first or second curved portion 20"a or 20"b, for example, due to defects of the light absorbing layer 25, the light reflected from the first or second curved portion 20"a or 20"b is reflected in a direction toward the subject and away from the image sensor, thereby preventing the reflected light from being incident on the image sensor. In addition, even if light is reflected from the first to third edge portions 27a to 27c, a degree of reflection of the light is decreased by the sharp shape of the first to third edge portions 27a to 27c. Therefore, deterioration of image quality due to the reflected light is prevented.

Referring to FIG. 1, the number of spacers may be varied. Although the description is provided in relation to the spacer having a relatively reduced thickness in FIGS. 2 through 5B, the spacer may have a relatively increased thickness. Therefore, the thickness of the spacer may vary according to the required resolution of the lenses.

Here, as illustrated in FIG. 1, in the spacer having a relatively reduced thickness, a plurality of inclined surfaces formed to be discontinuous are disposed at a wall surface forming a light blocking hole. In the spacer having a relatively reduced thickness, a wall surface thereof forming the light blocking hole may be any one of a perpendicular surface, an inclined surface, and a curved surface. The light absorbing layer 25 is disposed on wall surfaces of all spacers.

As set forth above, the lens module prevents light incident through the plurality of lenses from being reflected by the spacer disposed between the plurality of lenses and causing a flare phenomenon.

As a non-exhaustive example only, a terminal or device as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device capable of wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens module comprising:
   a lens barrel;
   lenses disposed in the lens barrel and aligned along an optical axis; and
   a spacer, disposed between the lenses, comprising a light blocking hole configured to allow light incident to the lenses to pass therethrough, and comprising a curved surface having a curvature along the optical axis;
   wherein a light absorbing layer is disposed on a wall surface of the spacer forming the light blocking hole.

2. The lens module of claim 1, wherein the light absorbing layer is a black coating film.

3. The lens module of claim 1, wherein the light absorbing layer comprises a black iron oxide.

4. The lens module of claim 1, wherein the wall surface of the spacer is inclined at a predetermined angle with respect to the optical axis so as to prevent a path of the light from being blocked by the wall surface of the spacer.

5. The lens module of claim 1, wherein the wall surface of the spacer is formed to be concave in order to prevent light reflected from the wall surface of the spacer to pass through the light blocking hole.

6. The lens module of claim 5, wherein the wall surface of the spacer is a curved surface comprising a preset curvature.

7. The lens module of claim 1, wherein the wall surface of the spacer is a curved surface configured to prevent light from being incident on other portions except for an edge portion, a portion at which an upper surface of the spacer and the wall surface of the spacer intersect each other.

8. The lens module of claim 1, wherein the wall surface of the spacer includes first and second curved portions comprising a preset curvature and an edge portion at which the first and second curved portions intersect each other.

9. The lens module of claim 8, wherein the first and second curved portions are discontinuous curves.

10. The lens module of claim 8, wherein the edge portion protrudes toward the optical axis further than other portions of the side wall of the spacer.

11. The lens module of claim 1, wherein the spacer is formed of a metal.

12. The lens module of claim 1, wherein the wall surface of the spacer includes first and second curved portions having a same distance from the optical axis, a first edge portion formed at an intersection between an upper surface of the spacer and the first curved portion and a second edge at which the first and second curved portions intersect each other, and a distance each of the first and second edge portions extend toward the optical axis is the same.

13. The lens module of claim 1, wherein the wall surface of the spacer includes first and second curved portions forming a mirror image with respect to an axis separating the first and second curved portions.

14. The lens module of claim 1, wherein the wall surface of the spacer comprises a sharp edge portion disposed between curved portions.

15. The lens module of claim 1, wherein a first curved portion extends directly from the light absorbing layer, and a second curved portion extends directly from a second light absorbing layer, and wherein the light absorbing layer and the second light absorbing layer are parallel to each other.

16. The lens module of claim 1, wherein the wall surface of the spacer includes first and second curved portions having a same radius of curvature.

17. A lens module comprising:
   a lens barrel;
   lenses disposed in the lens barrel and stacked along an optical axis;
   spacers, disposed between the lenses, comprising light blocking holes configured to allow light incident to the lenses to pass therethrough, wherein a wall surface of any one of the spacers forms the light blocking hole and comprises inclined surfaces, the wall surface of the spacer, forming the light blocking hole, is a curved surface having a curvature along the optical axis, and a light absorbing layer is disposed on the wall surface of the spacers.

18. The lens module of claim 17, wherein the inclined surfaces comprise discontinuous curves.

19. The lens module of claim 17, wherein an angle between an upper surface of one spacer of the spacers and the wall surface is less than 90°.

20. The lens module of claim 19, wherein an edge portion, disposed at the intersection of the upper surface and the wall surface, is sharp.

* * * * *